May 18, 1965 K. BESTER 3,183,918
TRANSDUCER ASSEMBLY FOR TRANSFORMATION OF
SMALL FORCES INTO PNEUMATIC PRESSURES
Filed Oct. 25, 1962 2 Sheets-Sheet 1

INVENTOR.
Karl Bester
BY
AGENT

3,183,918
TRANSDUCER ASSEMBLY FOR TRANSFORMATION OF SMALL FORCES INTO PNEUMATIC PRESSURES
Karl Bester, Speidelweg 22, Stuttgart-Rohracker, Germany
Filed Oct. 25, 1962, Ser. No. 234,006
Claims priority, application Germany, Oct. 28, 1961, B 64,582
4 Claims. (Cl. 137—85)

Transducers have been used in pneumatic systems in which measured values are indicated as units of pressure. In measuring, for instance, electrical quantities there have been developed dipping coil galvanometers and the force on the coil is balanced by an output pneumatic pressure.

An object of the invention is to provide a sensitive transducer responsive to input values, and which will provide corresponding pressure values for use in known pneumatic applications such as the control of pneumatically operated valves to mention only one example.

While there have been many transducers of this general type they generally are of low order sensitivity because of friction, large masses, required or accidental deformation of working parts and the like. These conditions often require the employment of large forces for the input, and inputs to the transducers often must be pre-amplified with consequent loss of faithfulness when the initially measured values are small.

Another object is to provide a transducer wherein the linearity of the input quantities with respect to output pressure extends over an appreciable range of use of the transducer.

Still another object is to provide a transducer of this type in which the nul point may be varied and one in which a balance beam is used which will be friction-free and free from structurally internal biasing moments on the beam at any number of nul conditions.

These objectives are obtained by the invention which briefly stated includes a combination of means for the transformation of small quantities of force into much larger pneumatic pressures wherein the force to be measured is counter balanced or compensated by a force derived from the output pressure, and the output pressure is controlled by an arrangement dependent on the force to be measured and the force of compensation. The compensation force is produced by the pressure of an air jet issuing from an opening in a chamber containing air at output pressure.

In the accompanying drawing showing, by way of example one of many possible embodiments of the invention, FIG. 1 is a diagrammatic representation of the invention;

Figure 1:
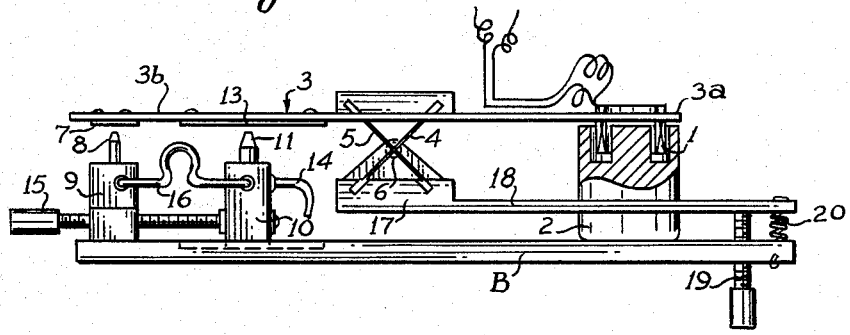
Figure 2:
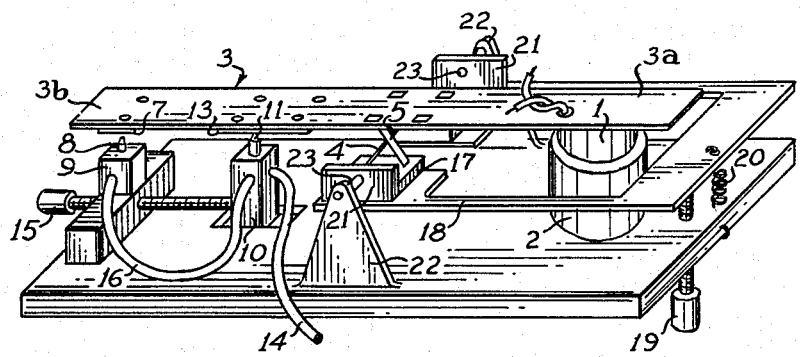
FIG. 2 is a perspective of the invention.

The invention as shown is a transducer or transformer for providing a controlled pneumatic pressure proportional to an input electrical current and the pressure may be used for actuating mechanisms such as pneumatic servo mechanisms and other devices in control work.

The transducer comprises a base B on which there is mounted fast a pot magnet 2 in which is disposed a dipping coil 1 secured on and under an end 3a of a balance beam 3. The forces developed between the magnet and coil range from zero, for no current, up to about 150 mg. under full load. The beam 3 may be of the type customarily used for analytical balances and the like, a total length of about 10 cm. being found to be satisfactory in a proven embodiment of the invention.

The beam is fulcrumed on coaxial alined sets of crossed spring blades 4 and 5 the crossing zones being considered to have an axis shown at 6, symmetry of the crossed blades assuring a substantially fixed axis. The mounting on the base of the resulting X-shaped fulcrum members is described below.

The opposite end 3b of the beam is provided with an under thin plate 7 of aluminum for moving, with the beam, in a vertical direction with changes of force of the coil. The plate serves as an impingement baffle for a weak jet of air issuing from the nozzle 8 serving as control for a pneumatic amplifier generally shown at 9 in FIG. 1 and in more detail in FIG. 3. The weak jet is from low pressure air, pressures of from 80 to 120 mm. of water being found satisfactory when the air issues from an orifice 0.5 mm. in diameter.

The amplifier 9 has a gain of about 200:1, and the output from the amplifier is led via a flexible conduit 16 to a chamber 10 provided with an impingement venting jet member 11 having an orifice of about 0.8 mm. in diameter for air impingement on an aluminum load baffle plate 13 between the fulcrum and the plate 7. The load for the output pressure is connected to chamber 10 by a conduit 14.

If the current to coil 1, say, increases to expel the coil and turn the beam counter-clockwise, the approaching of the plate 7 toward the nozzle 8 causes an increase in the pressure of the output from the amplifier so that the greater force by the jet from the member 11 (reflecting a build up in load pressure) acts on the beam to turn it clockwise until balance is obtained by the plate 7 reaching balancing distance from the nozzle 8 which with the amplifier acts as a pilot.

Since there is an impingement on the beam from jets issuing both from the nozzle 8 and from the jet member 11 and the two are at different distances from the fulcrum, even though the weaker is more remote, it is desirable to have the variation sum of the moments by the two jets tend to somewhat approach variation due to each. For this reason the chamber 10 is movable lengthwise of the beam by an adjusting screw 15. The plate 13 is long enough to remain over the jet member in the various positions of the chamber. However advantage may be taken of this type of adjustment merely to lessen or increase the moment due to working jet from member 11 and change the range of the device.

The device is capable of adjustment by other means and in connection with the mounting of the fulcrum blade members 4 and 5. The blade members are mounted in blocks 17 on a somewhat U-shaped lever member 18, more or less parallel with the base B, below yet tiltable about, the axis 6 of the fulcrum members. The amount of tilt is adjusted by an adjusting screw 19 threaded through the base B and bearing against the lever member, a tension spring 20 holding the lever member against the screw. For the mounting of the member 18 to tilt about the axis 6 the blocks 17 are provided with upstanding flanges 21 and the base 3 with upstanding ears 22. Coaxial pivot axles 23, alined with the lines of intersection of the planes of the blades 3 and 4 carry the flanges on the ears.

The next above described mounting of the fulcrum members enables a nul point adjustment without additional bias means. This is not only a simple construction but above all it enables the fulcrum members to be completely stainfree with respect to turning during a state of balance.

While a number of adjustments are possible, and accuracy will vary with, for instance, range of output pressure, at one particular setting of the device almost exact linearity between output pressure and electrical input to the coil was found for an output of from 120 to 500 mm. water column. Such is a typical range of linearity for a given setting and by varying the nul setting pressures as high as one atmosphere have been handled. The general sensitivity is about 0.1%. The data given herein are not to be taken as limits for the extent of conditions under which the device is operable and useful, but to illustrate an example of the conditions under which the invention has already been found to be operable and useful and to serve as guides to one skilled in the art as to what he can expect as at least minimum performance.

Figure 3:
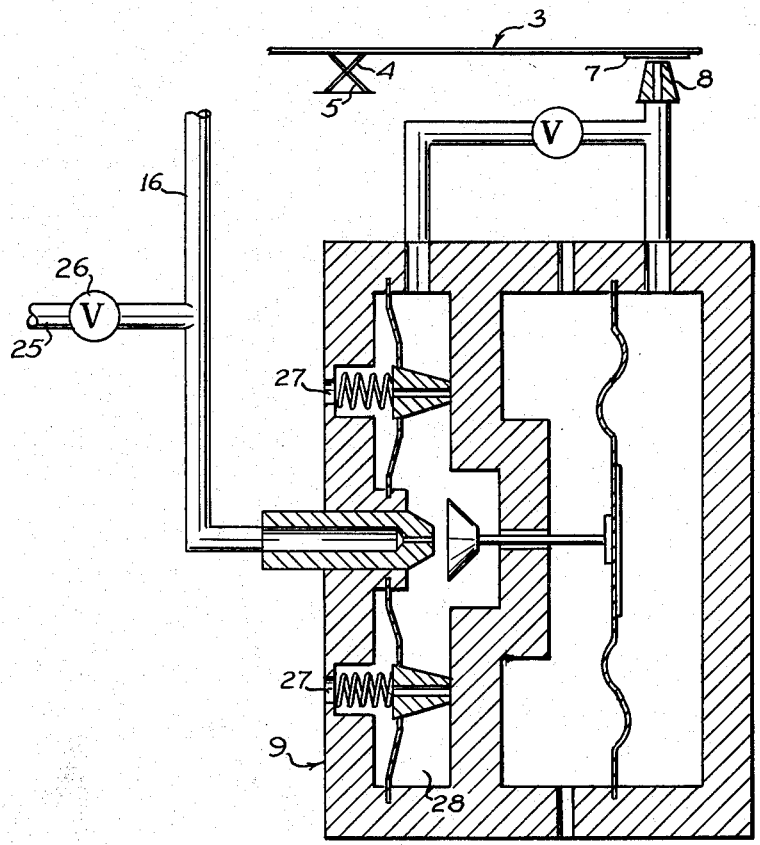
FIG. 3 shows the principle of construction of an element of the invention.

While various pneumatic amplifiers, generally designated 9 may be used, details of one such amplifier are shown schematically in FIG. 3, which will be readily understood by those skilled in the art.

A source of compressed air is connected to lead-in 25 at the arrow and throttled by a choke valve 26. It may be considered that outflow from the valve 26 is connected to the chamber 10 via the conduit 16 and that the amplifier bleeds off enough air to reduce the pressure in chamber 10 to the instant output pressure. The bleeding is primarily through vent ports 27 in the amplifier 9 and leaves the pressure in the compartment 28 at constant pressure and of the order of 80 to 150 inches water column depending on the design of the amplifier.

A transducer employing such an amplifier will reach equilibrium in 3 or 4 seconds under average operating conditions.

The invention claimed is:

1. A transducer for converting measuring forces of the order of 150 mg. and the like at full scale to pneumatic pressure of the order of an atmosphere comprising, a base; a balance beam, two spaced-like sets of a pair of like crossed spring blades, the planes of the blades of the two sets being coincident from set to set and mutually intersecting within the sets and end portions of all blades being secured on the beam to form a fulcrum mount; blocks carrying the respective sets of blades and cradled to swing with respect to the base about an axis coincident with the intersection of the planes of crossed blades; means for holding the blocks fixed with respect to each other and for varying the nul position of the beam with respect to the base; a dipping galvanometer coil pending from an arm of the beam and a magnet fast on the base for interaction with the coil; an air chamber mounted on the base near the beam and provided with a jet member so that air may issue from the chamber and jet member against the beam and tend to counteract on the beam against moments due to the magnet and coil, a pilot air nozzle directed toward an end of the beam for directing a weak stream of air against the beam; an amplifier pneumatically connected between the nozzle and air chamber to deliver air to the chamber at an air pressure higher than that of the air just before reaching the nozzle, and takeoff means on the chamber for pneumatically connecting a pneumatic load to the chamber.

2. A transducer as claimed in claim 1, said chamber being adjustably movable generally toward and away from said axis.

3. A transducer as claimed in claim 1, said means for holding the blocks being a lever arm carrying the blocks, and means for holding the lever in a predetermined angular position with respect to the base and about the axis.

4. A transducer for converting measuring forces to pneumatic pressure to atmosphere comprising a base; a balance beam; two spaced like sets of a pair of like crossed spring blades, the planes of the blades of the two sets being coincident from set to set and mutually intersecting within the sets and end portions of all blades being secured on the beam to form a fulcrum mount; mounting members carrying the respective sets of blades and cradled to swing with respect to the base about an axis coincident with the intersection of the planes of crossed blades; means for holding the members fixed with respect to each other and for varying the nul position of the beam with respect to the base; a galvanometer coil on an arm of the beam and a magnet fast on the base for interaction with the coil; an air supply member and provided with a jet member near the beam so that air may issue from the jet member against the beam and tend to counteract on the beam against moments due to the magnet and coil; a pilot air nozzle directed toward an end portion of the beam for directing a weak stream of air against the beam; an amplifier pneumatically connected between the nozzle and air supply member to deliver air to the air supply member at an air pressure higher than that of the air before reaching the nozzle, and takeoff means on the air supply member for pneumatically connecting a pneumatic load to the air supply member.

References Cited by the Examiner
UNITED STATES PATENTS

| | | | |
|---|---|---|---|
| 2,618,288 | 11/52 | Catheron | 137—85 X |
| 2,652,066 | 9/53 | Bowditch | 137—85 |
| 2,789,543 | 4/57 | Popowsky | 132—85 X |
| 2,949,273 | 8/60 | Roper | 137—85 |
| 2,972,443 | 2/61 | Watrous | 137—85 X |
| 3,085,556 | 4/63 | Peczkowski | 137—85 X |

WILLIAM F. O'DEA, *Primary Examiner.*